United States Patent
Aubin et al.

(10) Patent No.: US 9,007,213 B2
(45) Date of Patent: Apr. 14, 2015

(54) METHODS AND SYSTEMS FOR OBJECT IDENTIFICATION AND FOR AUTHENTICATION

(75) Inventors: Keith L. Aubin, Ithaca, NY (US); Jeffrey W. Baldwin, Alexandria, VA (US); Harold G. Craighead, Ithaca, NY (US); Brian H. Houston, Fairfax, VA (US); Jeevak M. Parpia, Ithaca, NY (US); Robert B. Reichenbach, Portland, OR (US); Maxim Zalalutdinov, Silver Springs, MD (US)

(73) Assignees: The United States of America as represented by the Secretary of the Navy, Washington, DC (US); Cornell University, Ithaca, NY (US)

( * ) Notice: Subject to any disclaimer, the term of this patent is extended or adjusted under 35 U.S.C. 154(b) by 1551 days.

(21) Appl. No.: 12/297,489

(22) PCT Filed: Apr. 19, 2007

(86) PCT No.: PCT/US2007/066940
§ 371 (c)(1),
(2), (4) Date: Apr. 7, 2009

(87) PCT Pub. No.: WO2007/149621
PCT Pub. Date: Dec. 27, 2007

(65) Prior Publication Data
US 2009/0206987 A1    Aug. 20, 2009

Related U.S. Application Data

(63) Continuation of application No. 60/793,334, filed on Apr. 19, 2006.

(51) Int. Cl.
| | |
|---|---|
| G08B 13/14 | (2006.01) |
| G06K 19/067 | (2006.01) |
| G06K 7/10 | (2006.01) |
| G06K 19/07 | (2006.01) |

(52) U.S. Cl.
CPC ........ *G06K 19/0672* (2013.01); *G06K 7/10336* (2013.01); *G06K 19/0723* (2013.01)

(58) Field of Classification Search
None
See application file for complete search history.

(56) References Cited

U.S. PATENT DOCUMENTS

| | | |
|---|---|---|
| 4,837,840 A | 6/1989 | Goldman |
| 5,175,424 A | 12/1992 | Lisimaque |
| 5,481,102 A * | 1/1996 | Hazelrigg, Jr. ............... 235/487 |

(Continued)

FOREIGN PATENT DOCUMENTS

| | | | |
|---|---|---|---|
| WO | WO 0167413 | * | 9/2001 |
| WO | WO 2004084131 A1 | | 9/2004 |

(Continued)

OTHER PUBLICATIONS

Zalalutdinov, M. et al. Shell-type micromechanical actuator and resonator. Applied Physics Letters. vol. 83 No. 18. Nov. 3, 2003.

(Continued)

*Primary Examiner* — Firmin Backer
*Assistant Examiner* — Brian Wilson
(74) *Attorney, Agent, or Firm* — Burns & Levinson LLP; Orlando Lopez

(57) ABSTRACT

Methods and systems for object identification and/or authentication.

15 Claims, 15 Drawing Sheets

(56) References Cited

U.S. PATENT DOCUMENTS

| | | | |
|---|---|---|---|
| 5,804,709 A * | 9/1998 | Bourgoin et al. | 73/105 |
| 5,844,681 A | 12/1998 | Alessi et al. | |
| 6,092,422 A * | 7/2000 | Binnig et al. | 73/651 |
| 6,122,964 A | 9/2000 | Mohaupt et al. | |
| 6,657,442 B1 * | 12/2003 | Seppa et al. | 324/661 |
| 6,683,451 B1 * | 1/2004 | Moore et al. | 324/218 |
| 6,812,696 B2 | 11/2004 | Murphy | |
| 6,819,246 B1 * | 11/2004 | Seppa | 340/572.7 |
| 6,828,786 B2 * | 12/2004 | Scherer et al. | 324/300 |
| 7,221,241 B2 | 5/2007 | Lutz et al. | |
| 7,280,078 B2 * | 10/2007 | Salsman et al. | 343/703 |
| 7,434,737 B2 * | 10/2008 | Zmood | 235/492 |
| 2003/0027354 A1 * | 2/2003 | Geli | 436/178 |
| 2003/0184412 A1 * | 10/2003 | Gorrell | 333/186 |
| 2003/0205621 A1 | 11/2003 | Soni et al. | |
| 2005/0151650 A1 * | 7/2005 | Wright et al. | 340/572.4 |
| 2005/0242904 A1 * | 11/2005 | Lutz et al. | 333/200 |
| 2007/0063613 A1 * | 3/2007 | Elata et al. | 310/306 |

FOREIGN PATENT DOCUMENTS

| | | | | |
|---|---|---|---|---|
| WO | WO 2005020434 | * | 3/2005 | H03H 9/00 |
| WO | WO 2005020434 A2 * | | 3/2005 | H03H 9/00 |

OTHER PUBLICATIONS

International Search Report for PCT/US07/66940 dated Feb. 26, 2008.

U.S. Appl. No. 60/793,334, filed Apr. 19, 2006, Resonant Spectrum Identification.

* cited by examiner

METHODS AND SYSTEMS FOR OBJECT IDENTIFICATION AND FOR AUTHENTICATION

CROSS REFERENCE TO RELATED APPLICATIONS

This application is a U.S. national stage application under 35 U.S.C. 371 of International Application No. PCT/US07/66940 filed Apr. 19, 2007 and entitled METHODS AND SYSTEMS FOR OBJECT IDENTIFICATION AND FOR AUTHENTICATION, which in turn claims priority of U.S. Provisional Patent Application Ser. No. 60/793,334, entitled "Resonant Spectrum Identification," filed on Apr. 19, 2006, which is incorporated by reference herein.

STATEMENT REGARDING FEDERALLY SPONSORED RESEARCH OR DEVELOPMENT

The U.S. Government has certain rights in the invention.

BACKGROUND

This invention relates generally to authentication and identification of objects, where identification in this context is used to mean recognizing to an acceptable degree of confidence an instance of an object. Objects may be any sort of object, and may themselves be associated with items, goods, people, animals, materials, and so on.

In security systems, there are many candidate identification technologies, including biometric technologies such as fingerprints, retinal scans, iris scans, and facial recognition algorithms. Biometric identification information is used to verify a unique identity.

One example of a conventional technology utilized to identify objects is Radio Frequency Identification (RFID) technology. With conventional Radio Frequency Identification (REID) technologies, an interrogator containing a transmitter generates an electromagnetic field through which an electronic tag containing a receiving antenna may pass. The electromagnetic field energizes the circuitry on the tag, which then transmits an identification number or code. Other functionality, such as data storage, or computation, also may be implemented on the tag.

Such technology may be used to identify objects, because, typically, an identification number communicated by the tag when it is energized is selected to be substantially unique, at least within the particular domain, and so the transmitted identification number may serve to identify the goods or people with which an object containing the tag is associated.

Such technology also may be used to authenticate (i.e., to verify) the identity of a person, animal, or thing associated with a tag, within a desired degree of confidence, if the tag is treated as evidence of the identity of such person, animal, or thing.

Generally speaking, RFID technology is useful for authentication only to the extent that it is difficult for a would-be forger or impersonator to replicate the behavior of a given tag, by manufacturing a duplicate tag, or otherwise. In many cases, the design of RFID tags is well known, and the technology is such that they may be duplicated. Some RFID tags exist that have encryption or other cryptographic functionality, but such tags are expensive, and the processing power on the tags is limited. As a result, it may not be feasible or cost-effective to maintain the security of a conventional RFID identification system against a determined attacker.

BRIEF SUMMARY

In one instance, an embodiment of the method of for identification and/or authentication of objects and/or materials includes connectively positioning a micromechanical resonator structure with respect to an object, the micromechanical resonator structure having a substantially unique predetermined characteristic signal, exciting motion of the micromechanical resonator structure, detecting a characteristic signal of the excited motion and comparing the detected characteristic signal to the substantially unique predetermined characteristic signal. The object/material can be identified/authenticated as a result of the comparison.

In another aspect, an identification medium (e.g., a card, tag, token, document, and so forth) includes identification information for a person. The identification information may be stored electronically, magnetically, and so forth (e.g., in a memory, disk, or on magnetic tape) and/or printed or otherwise visible on the medium. The identification information, as non-limiting examples, may include photographic information, biographic information, biometric information, descriptive information, demographic information, membership information, financial information, and so forth. The identification medium also includes a substrate, the substrate including a micromechanical resonator structure, the micromechanical resonator structure including one or more micromechanical resonators that each emit a characteristic signal in response to an excitation signal.

In one instance, the authenticity of the identification medium may be verified by exciting the micromechanical resonator structure and verifying that the characteristic signal is similar to an expected characteristic signal. The identification medium may also include a communications medium for communicating the excitation signal to the micromechanical resonator structures and other features. The micromechanical resonator structure may communicate wirelessly and/or over a wired communication medium with a reader.

In another aspect, an identification system includes a number of substrates connectively positioned with respect to an object. Each substrate includes a micromechanical resonator structure, the micromechanical resonator structure including one or more micromechanical resonators. The identification also includes a data store, the data store storing a number of stored characteristic signals. Each substrate has an associated respective stored characteristic signal. Each stored characteristic signal is recognizably distinct from the other stored characteristic signals. Each stored characteristic signal is suitable for comparison with a response of one of a micromechanical resonator structure to an excitation signal.

In one embodiment, the system of these teachings also may include an analysis subsystem for comparing the response of one of the micromechanical resonator structures to an excitation signal. The system also may include a number of objects, wherein each of the plurality of substrates is connectively positioned to a respective one of the substrates.

In another aspect, a method for manufacturing an identification medium includes constructing on a substrate a micromechanical resonator structure, the micromechanical resonator structure including one or more micromechanical resonators. The method includes connectively positioning the substrate with respect to an object. The method includes exciting the micromechanical resonator structure with an excitation signal, and receiving a response characteristic signal of the micromechanical resonator structure, the characteristic signal comprising a response of each of the micromechanical resonators to the excitation signal. The method includes storing the received responsive characteristic signal as an expected response of the device for later comparison.

In some embodiments, the micromechanical resonators are constructed such that fabrication variations detectably effect the characteristic signal. In some embodiments, the stored characteristic signal includes values derived from the characteristic signal. In some embodiments, the stored characteristic signal includes a frequency spectrum of the characteristic signal. In some embodiments, the method also includes delivering to a customer the object (with the connectively positioned substrate) and the stored characteristic signal.

In another aspect, a computer readable medium includes a number of stored characteristic signals, each stored characteristic signal is associated with a respective micromechanical resonator structure. Each stored characteristic signal is recognizably distinct from the other of the plurality of stored characteristic signals. Each stored characteristic signal is suitable for comparison with a response of a micromechanical resonator structure to an excitation signal. Each of the stored characteristic signals for comparison with a response of a micromechanical resonator structure to an excitation signal.

In another aspect, a method for identification includes transmitting an excitation signal to an object. The object includes a micromechanical resonator structure, which itself includes one or more micromechanical resonator devices. The method includes receiving a characteristic signal in response to the transmitted excitation signal. The received characteristic signal may include a combined response of each of the micromechanical resonators in the micromechanical resonator structure to the excitation signal. The method includes transmitting a signal confirming the identity of the object if the received characteristic signal is sufficiently similar to a stored characteristic signal associated with the object.

Other embodiments of the method of these teachings and embodiments of the system of these teachings are disclosed hereinbelow.

For a better understanding of the present teachings, together with other and further needs thereof, reference is made to the accompanying drawings and detailed description and its scope will be pointed out in the appended claims.

DETAILED DESCRIPTION

In one instance, sufficiently (also referred to as substantially) unique characteristic signals may be generated by micromechanical resonator structures when such structures are excited. Sufficiently unique refers to signals that are of sufficient uniqueness that there are enough of them to uniquely identify each object within a class of objects by association of a particular signal with each object in that class. Substantially (sufficiently) unique characteristic signals are such that regeneration or reassignment of an existing unique signal to another object within the class is highly unlikely or effectively impossible. The structures may have a unique characteristic signal due to their design and configuration in combination with limitations inherent in physical creation of such structures. Once constructed, a sample characteristic response signal of one or more resonator structures may be obtained and stored. The stored sample may be used thereafter with a degree of confidence to identify that resonator structure. For example, if the micromechanical resonator structure is attached or included in an object, the object may be identified. The disclosed technology thus may be used to identify and/or authenticate an object, and in turn, a person associated with such an object.

Applications that may benefit from such a sufficiently unique characteristic signal include, but are not limited to, applications that currently use RFID tags, such as proximity identification cards, credit cards, product identification, document identification, security systems, computer authentication systems, physical authentication systems, as well as other applications.

Figure 1:
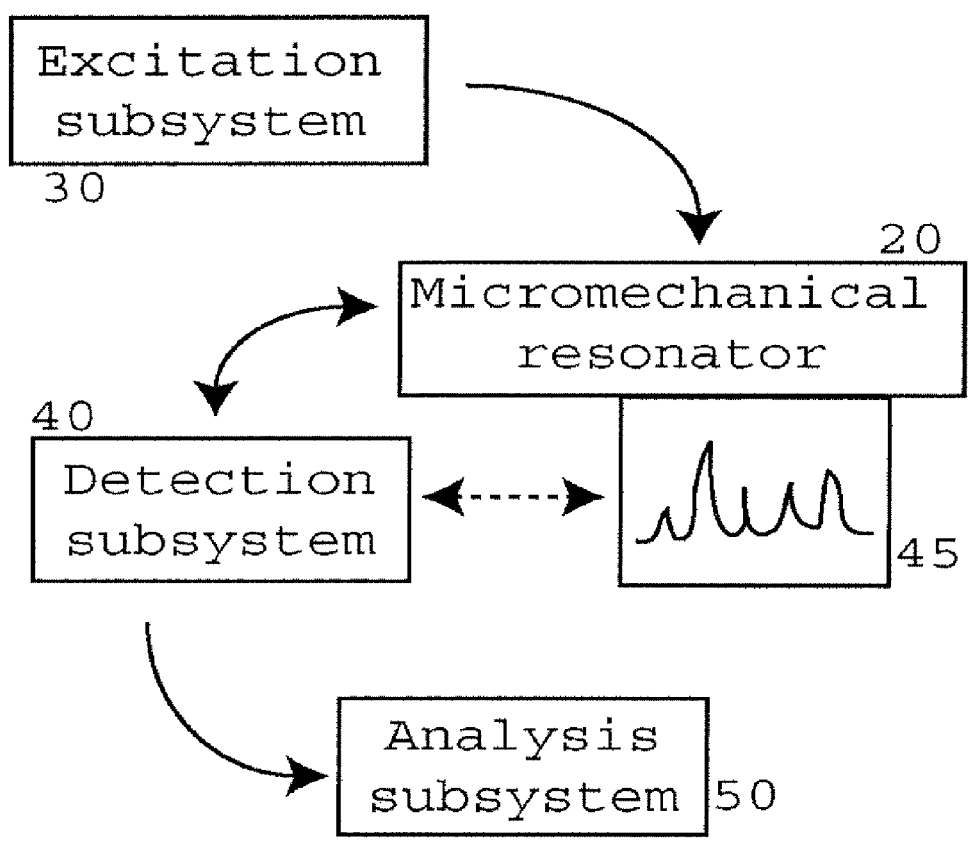
FIG. 1 is a schematic block diagram representation of an embodiment of the system of these teachings.

FIG. 1 depicts a schematic block diagram representation of an embodiment of a system according to an aspect of these teachings. Referring to FIG. 1, a micromechanical resonator structure 20 is subjected to excitation from an excitation subsystem 30. The excitation subsystem 30 is capable of exciting motion of the micromechanical resonator structure 20. The micromechanical resonator structure 20 is connectively positioned with respect to an object (not shown). The object may be any suitable thing, constructed out of any material, that may include, for example, but is not limited to, a solid, fluid, gel, liquid, textile or fabric, and/or some combination. The micromechanical resonator structure 20 may be connectively positioned in any suitable manner, including, but not limited to, being disposed on the object, being disposed on a substrate and the substrate affixed to the object, being intermixed with the object, being inter-textured with the object, and/or some combination. For example, a micromechanical resonator structure 20 may be implemented on a substrate, for example, and the substrate embedded in or mounted on an object such as a card. As another example, the object may be a liquid, and a substrate on which a micromechanical resonator structure 20 is implemented may be suspended in the liquid.

The micromechanical resonator structure 20 has a characteristic signal that is sufficiently unique (one of a kind) such that it may be distinguished from other signals with a degree of confidence. The characteristic signal may be determined by measurement performed by one or more of a variety of techniques. A detection subsystem 40 is capable of detecting such a characteristic signal 45 when motion of the micromechanical resonator structure 20 is excited. For example, the characteristic signal 45 can include, but is not limited to, a vibration spectrum or a spectrum of the induced motion or phase as a function of frequency for the induced motion or phase of response with respect to the detection subsystem and/or some combination. For example, the relative amplitude, quality factor and/or phase of a single- or multi-molded resonant spectrum may be detected.

An analysis subsystem 50 compares the detected characteristic signal to a previously determined characteristic signal. If the detected characteristic signal is sufficiently similar to the previously determined characteristic signal, the object connectively positioned with respect to the micromechanical resonator 20 may be identified and/or authenticated.

Figure 4A:
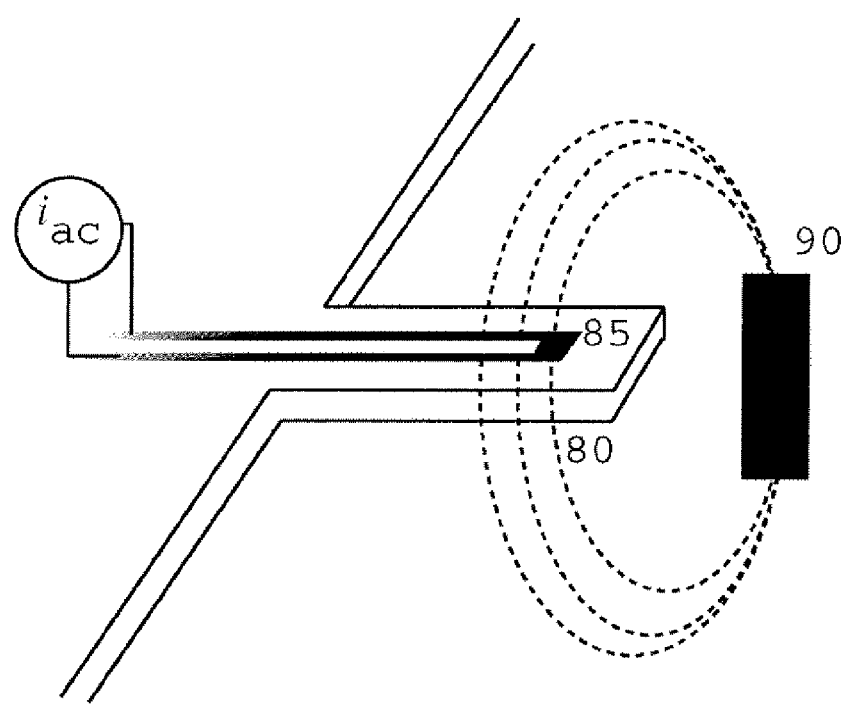
FIGS. 4a, 4b are graphical schematic representations of yet other embodiments of a component of the system of these teachings.
Figure 4B:
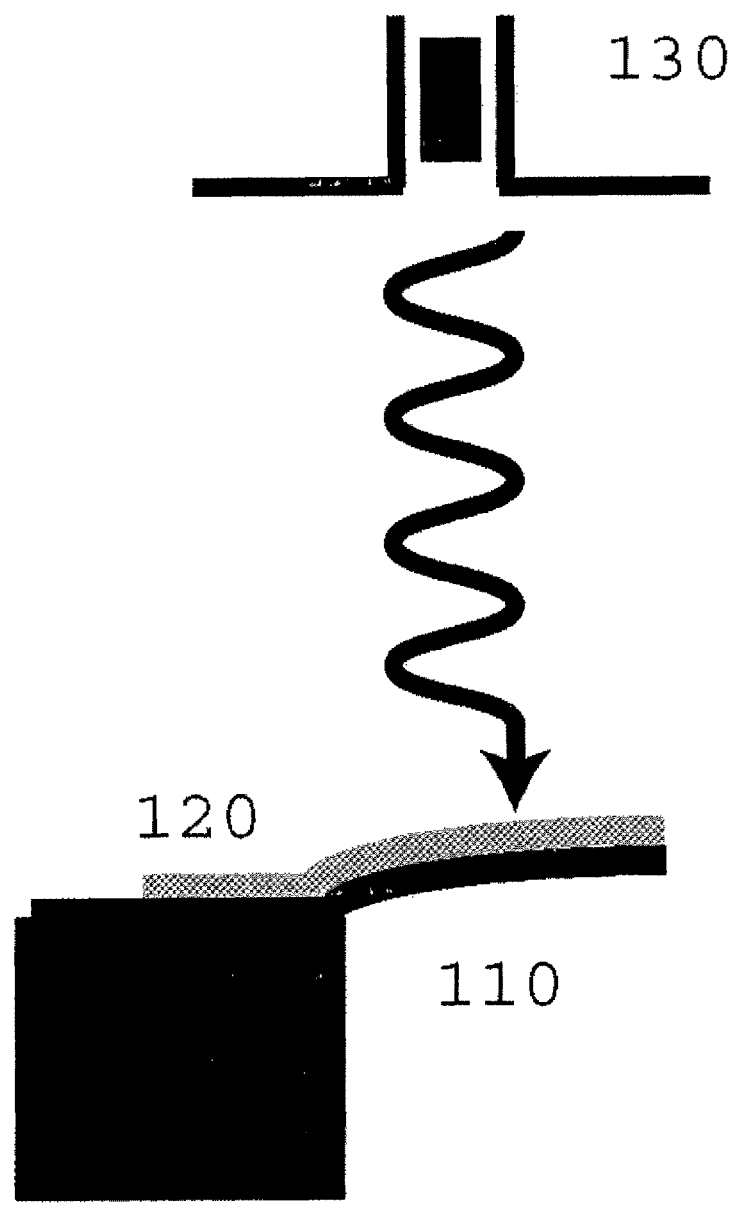
Figure 5A:
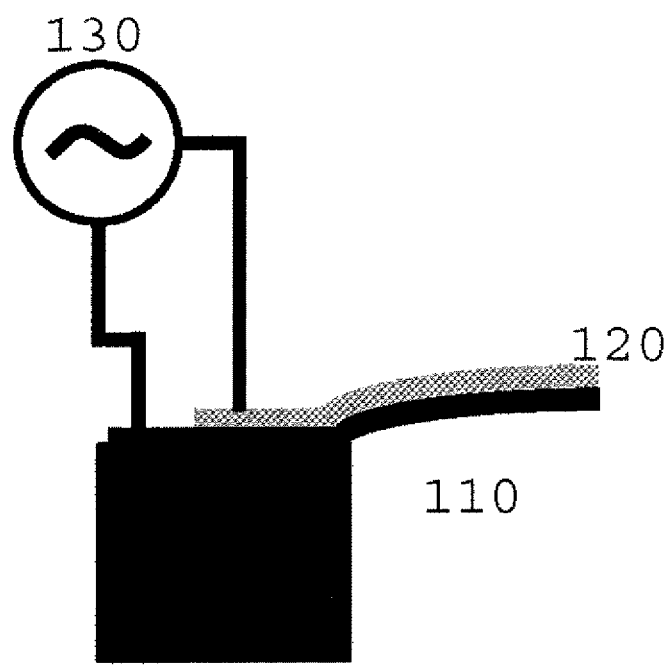
FIGS. 5a, 5b are graphical schematic representations of further embodiments of a component of the system of these teachings.
Figure 6:
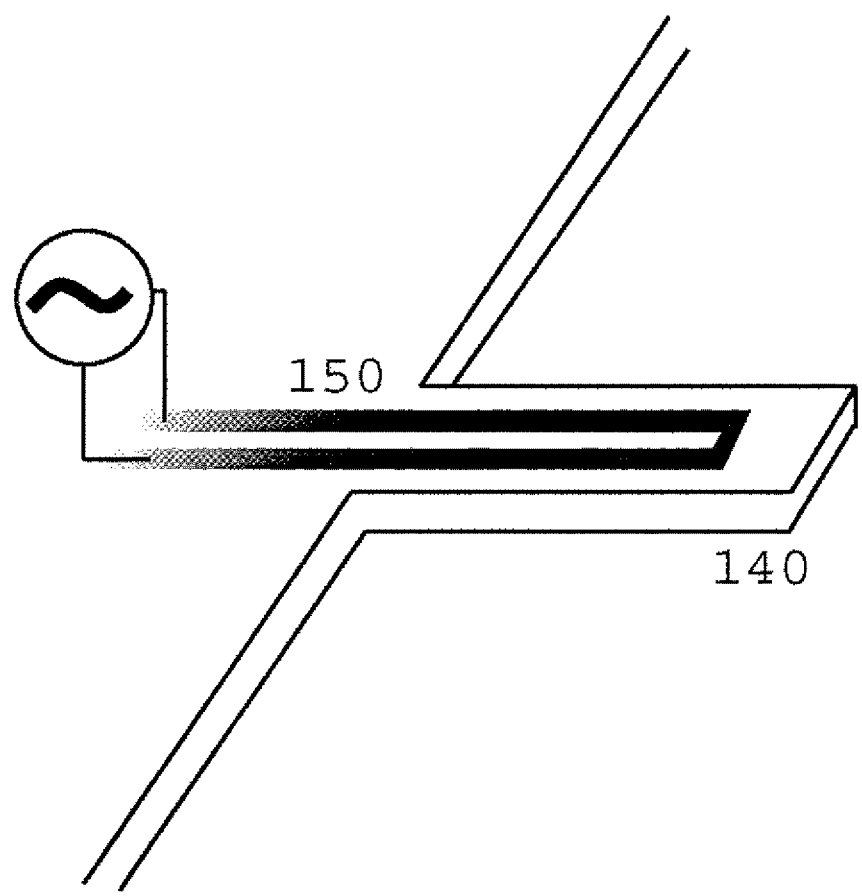
FIG. 6 is a graphical schematic presentation of a yet further embodiment of a component of the system of these teachings.
Figure 7:
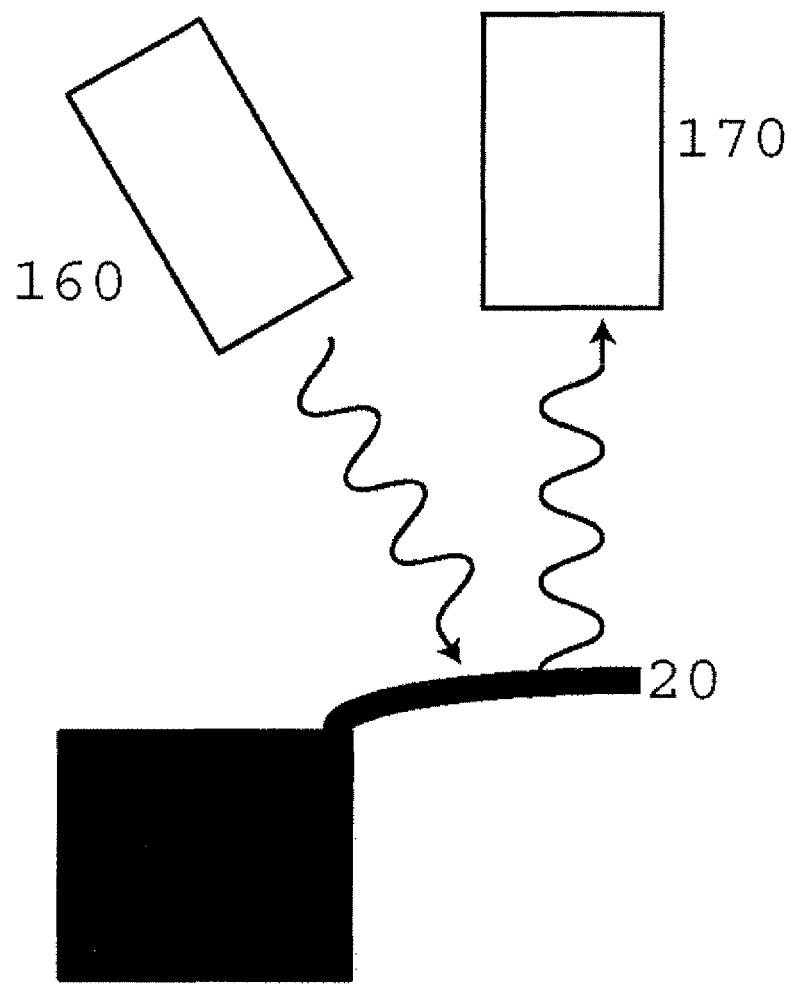
FIG. 7 is a graphical schematic representation of still a further embodiment of another component of the system of these teachings.

FIGS. 2, 3, 4*a*, 4*b* and 5*a*-5*b* show various embodiments of excitation subsystems, such as the excitation subsystem 30. FIGS. 6 and 7 show embodiments of a detection subsystem. FIGS. 9, 10 and 11*a*, 11*b* depict embodiments of micromechanical resonator structures, such as the micromechanical resonator structure 20.

Figure 9:
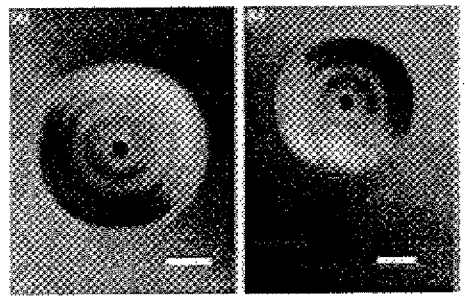
FIG. 9 is a graphical schematic representation of an embodiment of another component of the system of these teachings

A shell type micromechanical resonator structure is shown in FIG. 9. In one instance, the shell type micromechanical structure is constructed by fabricating a thin-film membrane over a gap. One means of fabricating such a thin-film membrane, but not the only means, is to begin with a suitable substrate, such as silicon, and grow, deposit, or otherwise obtain upon the silicon substrate a sacrificial film of material such as silicon dioxide. Subsequent to obtaining a sacrificial film upon the substrate, a film of material from which the thin-film membrane will ultimately be created, is grown, deposited, or otherwise placed upon the sacrificial layer. This film that will contain the device is commonly referred to as the device-layer of material. Common device-layer films include, but are not limited to, silicon, silicon nitride, and polysilicon. The device-layer is patterned in such a way as to create the thin-film membrane device upon removal of the sacrificial layer. One means of patterning the device layer is to mask the device layer with photoresist, perform photolithography, remove the exposed photoresist, and finally reactive ion etch away portions of the device layer. Another method of patterning the device-layer would be to use electron-beam resist and pattern the electron-beam resist with an electron beam. Reactive ion etching would then be used to remove portions of the device layer. These two methods are not exclusive of other methods that can be used to pattern the device layer, and other methods include, but are not limited to, ion milling the device layer or using biological samples such as self-assembled s-layer proteins as a mask. The exposed sacrificial layer is typically removed by means of isotropic etching. Typically, but not exclusively, this is performed with hydrofluoric acid. When a suitable amount of sacrificial material is removed from beneath the device layer, the etch is stopped and the thin-film membrane is created. Technical papers describing this process in detail can be referenced: Zalalutdinov et al., Applied Physics Letters, Vol. 83, pp. 3815-3817. 2003; also, Zalalutdinov et al., Applied Physics Letters, Vol. 78, pp. 3142-3144. 2001. Note that this latter reference describes a structure different from that shown in FIG. 9, but for which the fabrication process is similar and the device has a unique characteristic signal typical of that described in these teachings. This latter device is commonly referred to as a mushroom-type resonator, or a center-clamped plate resonator, or as simply a suspended plate resonator.

Figure 10:
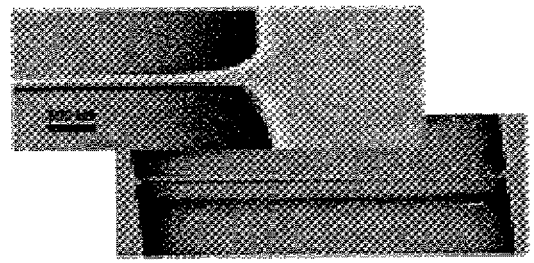
FIG. 10 is a graphical schematic representation of another embodiment of another component of the system of these teachings.

A string type micromechanical resonator structure is shown in FIG. 10. In one instance, the string type micromechanical resonator is fabricated utilizing photolithography tools. (See for instance, Verbridge et al., J. App. Physics, High-quality factor resonance at room temperature with nanostrings under high tensile stress, volume 99, 124304, 2006, which is incorporated by reference herein.) A string-type micromechanical resonator structure is shown in FIG. 10. In one instance, the string type micromechanical resonator is fabricated using non-lithographic techniques. This method is described in, for example, Verbridge et al., Journal of Applied Physics, Vol. 99, 124304, 2006. In the method described in the paper, poly methyl methacrylate) (PMMA) is deposited onto a device layer of material using electrospinning. Micro- and nano-scale structures are achievable using electrospinning. The PMMA is subsequently used as a mask layer for patterning of the device layer. Once the device layer is patterned using, for example, reactive ion etching, a sacrificial layer below the device layer is removed, for example, with isotropic etching.

Other methods for making string-type micromechanical resonators are also commonly used. For example, the methods described with respect to FIG. 9 can be used to fabricate string-type resonators, Photolithography or electron-beam lithography can be used to pattern resist on a device layer. Such a process is described in, for example, Carr & Craighead, Journal of Vacuum Science and Technology B, Vol. 15(6), 2760-2763 (1997). As described above, the patterned device layer is suspended in subsequent fabrication steps by removal of a sacrificial layer of material upon which the device layer rests. Upon removal of the sacrificial layer, the device is freely suspended and can resonate.

Shell-type or dome resonator structures, string or double-clamped beam resonating structures, mushroom or suspended plate resonating structures, and cantilever structures have been described as resonators that may be used in micromechanical resonator structures. It should be understood that these structures are not exclusive of the types of micromechanical (which may include nano-mechanical) structures that also may be used, instead, in addition or in combination. For example, bridge resonators, slit resonators, ring resonators, disc resonators, wine-glass resonators, plate resonators and tuning fork resonators are non-limiting examples of structures that may be used.

Figure 11A:
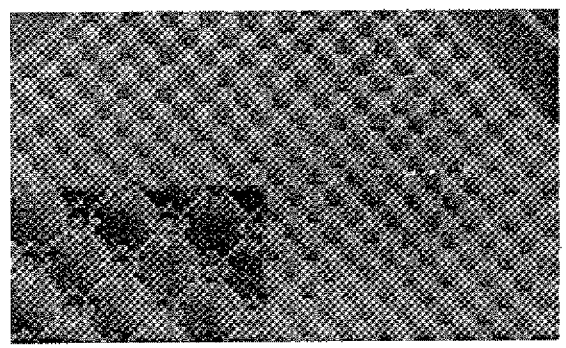
FIGS. 11a, 11b are graphical schematic representation of other embodiments of another component of the system of these teachings.

It is also possible to fabricate coupled arrays of resonators. Such a structure is shown in FIG. 11*a* (from Zalalutdinov et al., Applied Physics Letters, Vol 88, 143504, 2006, which is incorporated by reference herein.). The structure in FIG. 11*a* is a two-dimensional coupled array, though one-dimensional coupled arrays are also possessive of the unique resonance properties described throughout these teachings. The structure in FIG. 11*a*, which is indicative of, but not an exclusive example of, such a two-dimensional coupled array, is fabricated using an SOI wafer and techniques similar to those described with respect to FIG. 9. Electron-beam resist and lithography may be used to pattern the device layer, and subsequent isotropic etching removes the sacrificial layer, releasing the resonator devices. A two-dimensional coupled array is one in which each resonator is mechanically coupled to other resonators. Such coupling is typically achieved through device-layer interconnects (such as those shown in FIG. 11a, which are thin beams in the device layer), though other means of coupling can be used, including coupling of the motion of one resonator to the others through the substrate. One important feature of a coupled array of resonators, and a feature not exclusive to two-dimensional coupled arrays, is that, because of the coupling of resonators, the response of the array to excitation is a strongly-dependent function of the conditions of the entire array. For example, exciting the array in one particular portion of the array is likely to produce a response significantly different than the response obtained by exciting a different portion of the array. Response is taken to include the frequency response, the amplitude at each frequency of the response, and the phase response, but is not exclusive to these only. Additionally, it is not necessary for the coupled array of resonators to exhibit different responses when excited in different positions or by different means.

Figure 11B:
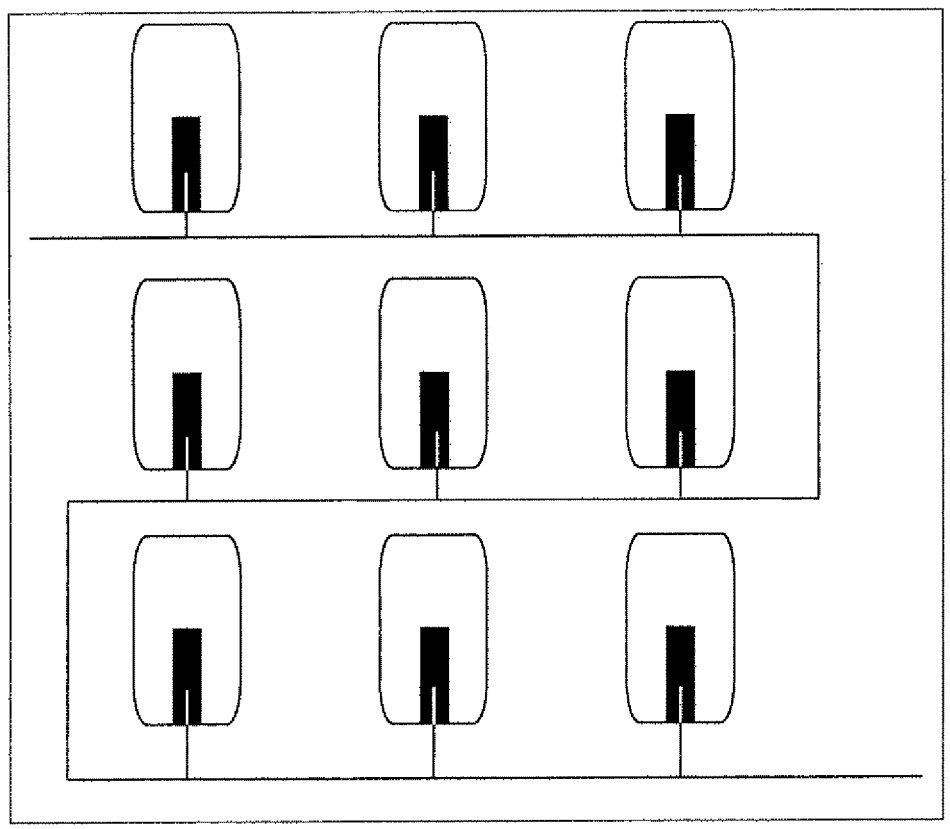

A 2-dimensional array of cantilever beam type micromechanical resonators is shown in FIG. 11b. In the array shown in FIG. 11b, the characteristic signal corresponding to excited motion of the array is substantially a combination of the characteristic signals of each micromechanical resonator in the array structure.

In one instance, the characteristic signal, such as, but not limited to, the frequency spectrum and/or the phase versus frequency characteristic, of each micromechanical resonator is constructed to be substantially unique due to the high Q (referred to also as the quality factor) of the resonator behavior and small imperfections resulting from microfabrication variations. The small imperfections induced by microfabrication variations (typical of any fabrication process but accentuated by the small size of the features) detectably alter the characteristic signal. Fabrication variations are an unavoidable consequence of micro- and nanofabrication techniques. The variations are caused both by random, atomic-level variation in processes such as, but not exclusive to, reactive ion etching, thin-film growth, and isotropic etching, as well as by resolution limits of lithography tools such as, but not limited to, photolithography tools, ion mills, and electron beam lithography tools. Even state-of-the-art tools exhibit atomic level fabrication variability, and all state-of-the-art tools will always exhibit such variability unless those tools involve the individual positioning of every atom comprising the resonator structure. It is noteworthy that in many applications, such as but not limited to microelectromechanical systems for accelerometers, such fabrication variability is undesirable and significant time and resources are devoted to attempting to reduce such variability. While often not desirable in other applications, microfabrication variations are a benefit in this context, because they make it difficult to deliberately duplicate a micromechanical resonator structure, and the resulting characteristic signal produced by that micromechanical resonator structure.

For example, for resonators with quality (Q) factors between 10,000 and 50,000, it is possible to identify shifts of less than 1 kHz from the center frequency. If imperfections due to manufacturing a 10 MHz resonator may result in no less than a +/−3% frequency error, which is typical, there are approximately 600 different detectable values for that resonator, which value will be randomly established during manufacturing process by fabrication-induced variations.

As one non-limiting example, a micromechanical resonant structure with six modes could exhibit more than $10^{14}$ possible combinations of resolvable mode frequencies. In this example, each mode is assumed to have a resonant frequency near 10 MHz and have a quality factor of approximately 10,000. These values of typical of commonly fabricated micro- and nanomechanical resonators. Given a typical variability of the resonant frequency of about +/−1.5%, there are then 300 different, resolvable frequencies for one such resonant mode. Given that the example uses six resonant modes, assumed to have equal variability and nominal resonance frequencies near 10 MHz, then the number of possible combinations of identifying signals, taken as the superposition of the six resonance frequencies, is 300*299*298*297*296*295, which is $\sim 10^{14}$.

Here, a mode is a particular resonant mode of the resonator. For example, a string resonator has modes corresponding to harmonic multiples of the fundamental frequency. Other types of resonators have modes having frequencies that are multiples of the fundamental mode in addition to modes having frequencies that are not related to the frequency of the fundamental mode. Some of these modes have frequencies that are relatively closely spaced in frequency space, so that, for example, within a 3 MHz frequency window on a detector, the frequencies resulting from multiple excited modes might be detectable. FIG. 4c is an example of just such a detection window, which is wide enough in frequency space to observe the frequencies of eight distinct resonance modes of a shell-type resonator. FIG. 4c is taken from Zalalutdinov et al. Applied Physics Letters, Vol. 83(18), 3815-3817, 2003.

For an array of such micromechanical resonators, the number of possible combinations of frequencies in the spectrum can be greater than $10^{60}$. The large number of possible choices of characteristic signal results in a characteristic signal that is substantially unique.

Figure 2:
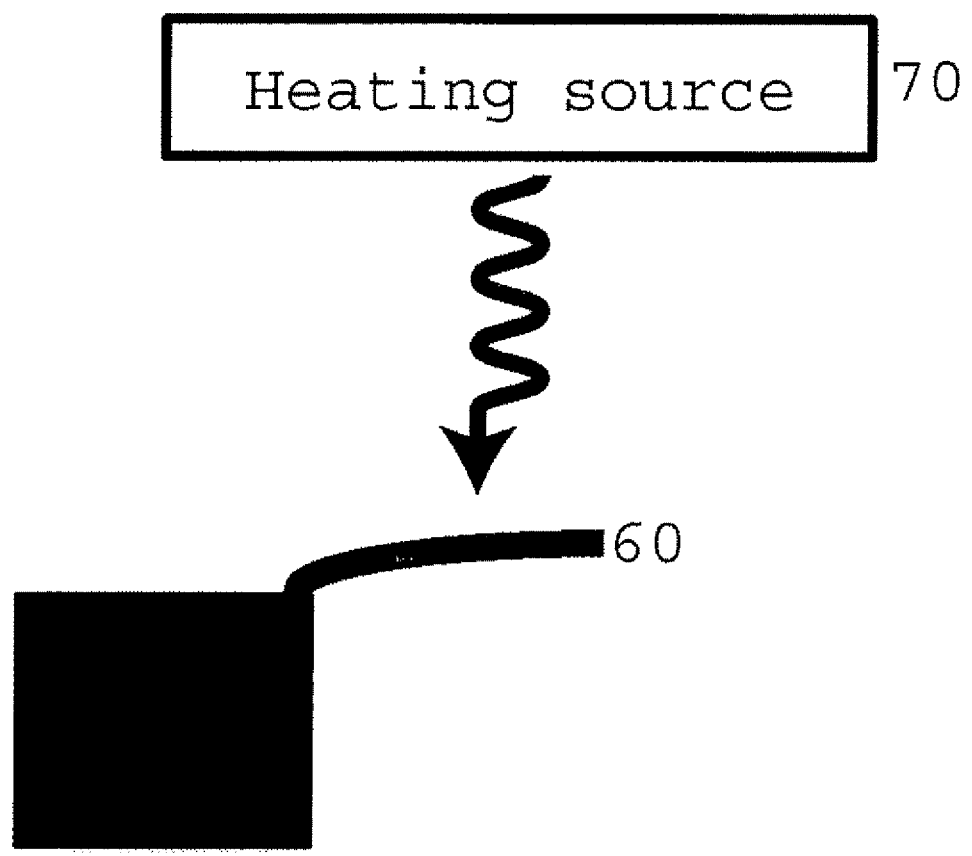
FIG. 2 is a graphical schematic representation of an embodiment of a component of the system of these teachings.

An embodiment of the excitation subsystem 30 is shown in FIG. 2. (In one embodiment, the excited motion comprises frequencies within a frequency range of the sufficiently unique previously determined characteristic signal.) In the embodiment of an excitation subsystem 30 shown in FIG. 2, a heating component 70 induces thermal heating and thermal stresses in the micromechanical resonator structure 60. The heating component may be local, and provided in the same substrate, or in the same device or object, as the micromechanical resonator structure 60, and/or the heading component may be provided externally, such as part of a exciter. Any suitable heating component 70 may be used. As a non-limiting example, a laser is used as a heating element. As another example, an infrared-emitting diode may be used. Typical powers used to thermally excite resonators are on the order of microwatts. Depending upon the exact excitation mechanism, the efficiency of the coupling between the excitation mechanism and the resonator, and the thermal properties of the resonator itself, such powers would typically induce local temperature changes in the resonator on the order of 1 degree Kelvin. Such temperature changes within local areas of the resonator material result in local stress which leads to local deformation of the resonator on the order of nanometers (or less), which is the source of the resonant motion. The aforementioned values are typical of devices described in the following papers, Aubin et al. Journal of Microelectromechanical Systems, Vol. 13(6), pp. 18-1026, 2004; and Reichenbach et al. IEEE Electron Device Letters, Vol. 27(10), pp. 805-807, 2006; but it should be understood that the values needed may be different depending on the type of excitation used, structure selected, and the particular configuration.

Figure 3:
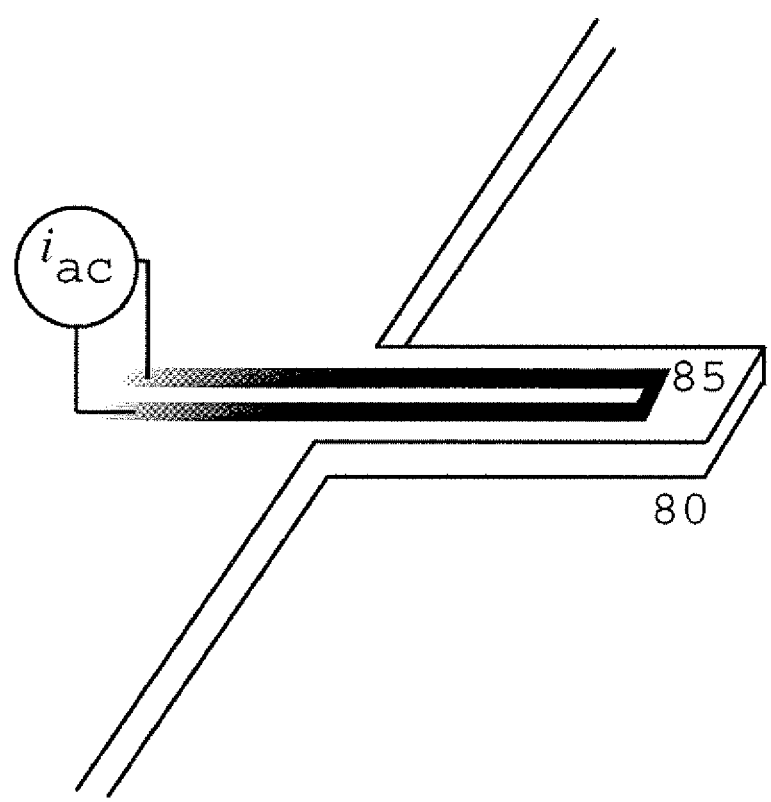
FIG. 3 is a graphical schematic representation of another embodiment of a component of the system of these teachings.

Referring to FIG. 3, in various embodiments, a local heating component can be a patterned resistive region, such as region 85 on micromechanical resonator structure 80, that is proximate to the micromechanical resonator structure 80. Such a patterned resistive region may generate heat when energized. Thus, a circuit may be configured to receive radiant energy (e.g., from an energizing signal) and energize to such a resistive region to generate heat. Such a circuit also may be powered by a battery, power line, or other power source.

In another embodiment, shown in FIG. 4a, the micromechanical resonator structure 80 may be configured such that motion is induced by the Lorentz force (the orthogonal force acting on a charged particle traveling in an electric field). The micromechanical resonator structure 80 may for example be placed in a magnetic field, produced by source of magnetic field 90, and has an electrical conductor 85 associated with it that has a current induced within it by an excitation signal, so that the conductor experiences a force that is transferred to the micromechanical resonator structure 80, which will in turn vibrate. A typical magnetic field that would be used to excite a resonator in such a configuration as described above is on the order of 1-7T. See, for example, Cleland & Roukes, Applied Physics Letters, Vol. 69(18), pp. 2653-2655, 1996.

The magnetic field may be provided, e.g. by a permanent or electromagnet on or near the substrate or, during reading, by an external field applied at the same time as an excitation signal to supply the current $i_{ac}$. The current in the conductor may be induced through an associated antenna, e.g. a coil that couples the excitation signal to the electrical conductor 85, and the same circuit may be used to detect a change in impedance when the micromechanical resonator structure vibrates.

Figure 5B:
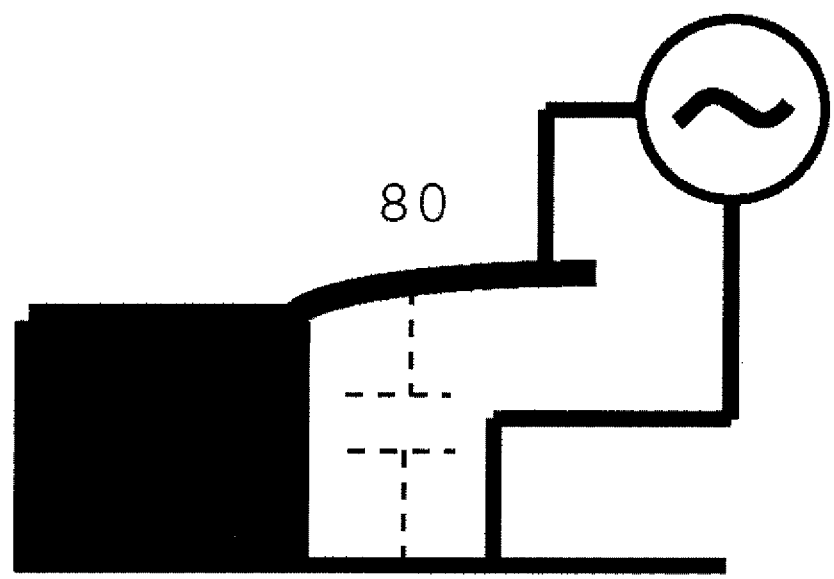

In one embodiment, shown in FIG. 5b, motion of the micromechanical resonator structure 80 is induced by an electrostatic force. For example, a charged micromechanical resonator structure may move under an electrostatic attractive and/or repulsive force with one or more electrodes. In one instance, the micromechanical resonator structure 80 is provided with an electrode thereon that couples capacitively with a further electrode. The two electrodes may connect with an electric circuit for supplying an ac current thereacross. When the ac current has frequencies that correspond to frequencies in the characteristic signal of the micromechanical resonator structure 80, the micromechanical resonator structure 80 may be strongly excited. The ac frequency used to excite motion in the resonator can be the fundamental resonance frequency of the resonator, or can be any multiple or fraction of the resonance frequency of the resonator.

In one embodiment, shown in FIG. 6, motion of the micromechanical resonator structure 140 is induced by a piezoelectric force. For example, the micromechanical resonator structure 140 may have a piezoelectric material 150 provided thereon, with electrodes on opposing sides of the material that connect with a circuit for supplying an ac current thereacross. When a current is applied to the piezoelectric material, the material will strain, e.g. expand and contract, and will cause the resonant member to deflect upwardly or downwardly.

The micromechanical resonator structure 140 may include one or more layers of piezoelectric material 150, and in one embodiment, the micromechanical resonator structure 140 includes a pair of piezoelectric layers arranged to deflect in opposite directions, e.g. by having their polarization directions pointing in opposite directions or by applying the current to each layer in opposing polarities. The use of piezoelectric layers is an exemplary embodiment of exciting motion of the micromechanical resonator structure by coupling motion from another structure.

Figure 4C:
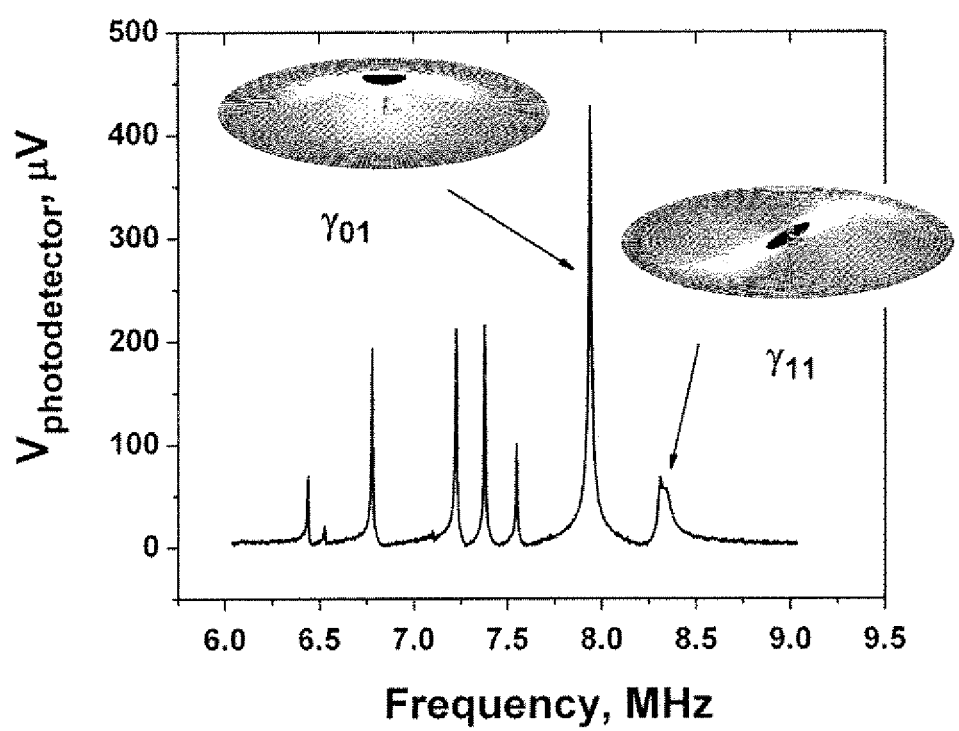
FIG. 4c is an example of a typical amplitude response of a shell-type resonator across a 3 MHz frequency span.

In one embodiment, shown in FIGS. 4b and 5a, the micromechanical resonator structure 110 may include one or more layers of conductive material 120 and the one or more layers of conductive material 120 may be electrically connected to ground. The micromechanical resonator structure 110 is exposed to an electromagnetic field from a source 130. (The electromagnetic field source can be connected directly to the conductive layer 120, as in FIG. 5a or can be a radiating source as in FIG. 4b.) The one or more layers of conductive material 120 can include a piezoresistive layer. In some instances in which the one or more layers of conductive material 120 include a piezoresistive layer, the excitation of the motion may include both electromagnetic forces exciting the micromechanical resonator structure and induced stresses in the micromechanical resonator structure. Since a quasi-static magnetic or electric field is an electromagnetic field, excitation by magnetic fields and quasi-electrostatic fields are examples of exciting the micromechanical resonator structure electromagnetically.

Another way to electromagnetically excite the micromechanical resonator structure includes exciting surface plasmons on one or more layers of conductive material 120. In some such embodiments, in which surface plasmons are excited on one or more layers of conductive material deposited or disposed on the micromechanical resonator structure, the one or more layers of conductive material are connected to an external circuit or ground.

In some embodiments, the micromechanical resonator structure 110 is excited by impinging acoustic waves. If the source 130 in FIG. 4b is replaced by a source of acoustic waves, the acoustic waves may excite motion of the micromechanical resonator structure 110. The one or more layers of other material 120 are not required if acoustic waves are used as the excitation.

Since many of the excitation systems are substantially linear and reciprocity applies, techniques applied for excitation also may be applied for detection. For example, in the embodiment shown in FIG. 7, the device 160 is a light source (where a light source may provide electromagnetic radiation over frequencies other than in the visible frequency range), such as, for example, a laser, utilized to optically detect the characteristic signal by reflecting and/or scattering the radiation from the light source 160 by the micromechanical resonator structure 20. A detector 170 receives the reflected/scattered radiation. The embodiment shown in FIG. 7 is an exemplary embodiment of a displacement detection subsystem. The embodiments shown in FIGS. 3 through 6, for example, also can be applied to electromagnetically detecting the characteristic signal.

Figure 8:
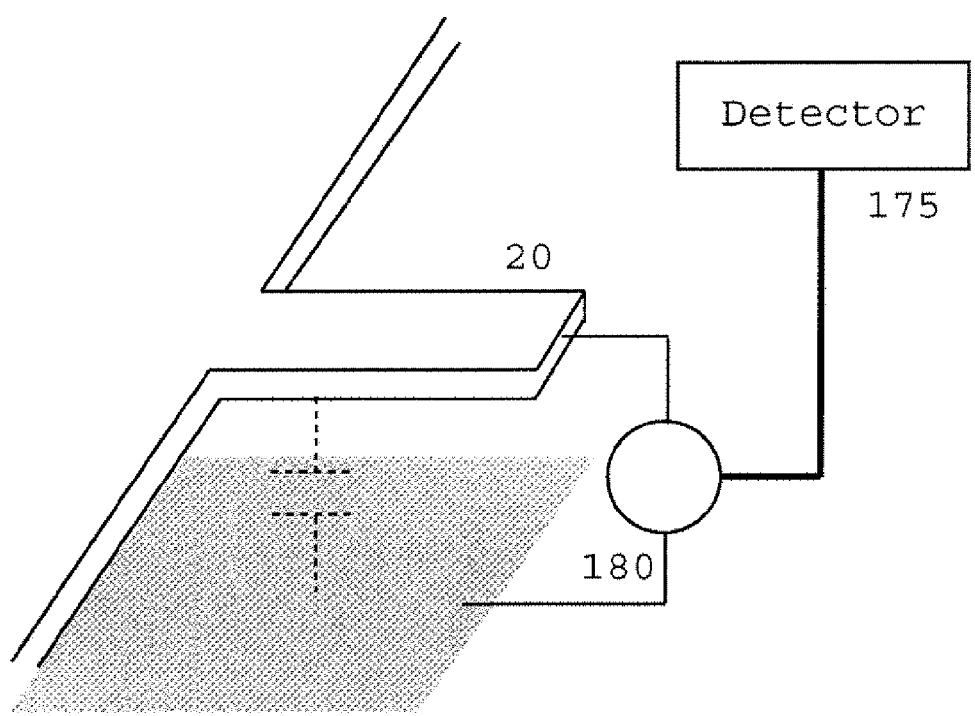
FIG. 8 is a graphical schematic representation of yet another embodiment of a component of the system of these teachings.

In an embodiment shown in FIG. 8, a component 180 that senses a change in impedance (such as, but not limited to, one plate of a capacitor, where the micro mechanical resonator structure 20 is the other plate of the capacitor or a proximity sensor sensing a change in inductance, for example, where the micromechanical resonator structure 20 has a region of deposited magnetic material) is utilized to detect motion of the micromechanical resonator structure 20.

In the embodiment shown in FIG. 8, a component 180 that senses a change in impedance (such as, but not limited to, one plate of a capacitor, where the micromechanical resonator structure 20 is the other plate of the capacitor or a proximity sensor sensing a change in inductance, where the micromechanical resonator structure 20 has a region of deposited magnetic material) is utilized to detect motion of the micromechanical resonator structure 20.

In a variation of the embodiment shown in FIG. 8, the component 180 conducts a current as a result of electromagnetic interactions between the resonator and the substrate (the top and bottom plates of a capacitor-like structure, respectively). The induced current may be directed to another circuit through electrical connections and detected as a direct result of motion of the resonator. The induced current also may be measured directly as a means of detecting the motion of the resonator. Alternatively or in addition to the aforementioned measurements, the induced current may be converted into a voltage, for example by a transresistance amplifier, resistor, or other means of transducing voltage from current.

The detected signal obtained in the detection subsystem 40 of FIG. 1 is analyzed in order to obtain the characteristic signal. A component (175, FIG. 8), such as, but not limited to, a spectrum analyzer, an interferometric system, and/or a spectrophotometer, is used in order to obtain the characteristic signal. In one embodiment, the characteristic signal is the frequency spectrum (in one instance, the amplitude as a function of frequency). In another embodiment the characteristic signal is the phase as a function of frequency. The characteristic signal may be some combination of these or other suitable signals.

Figure 12:
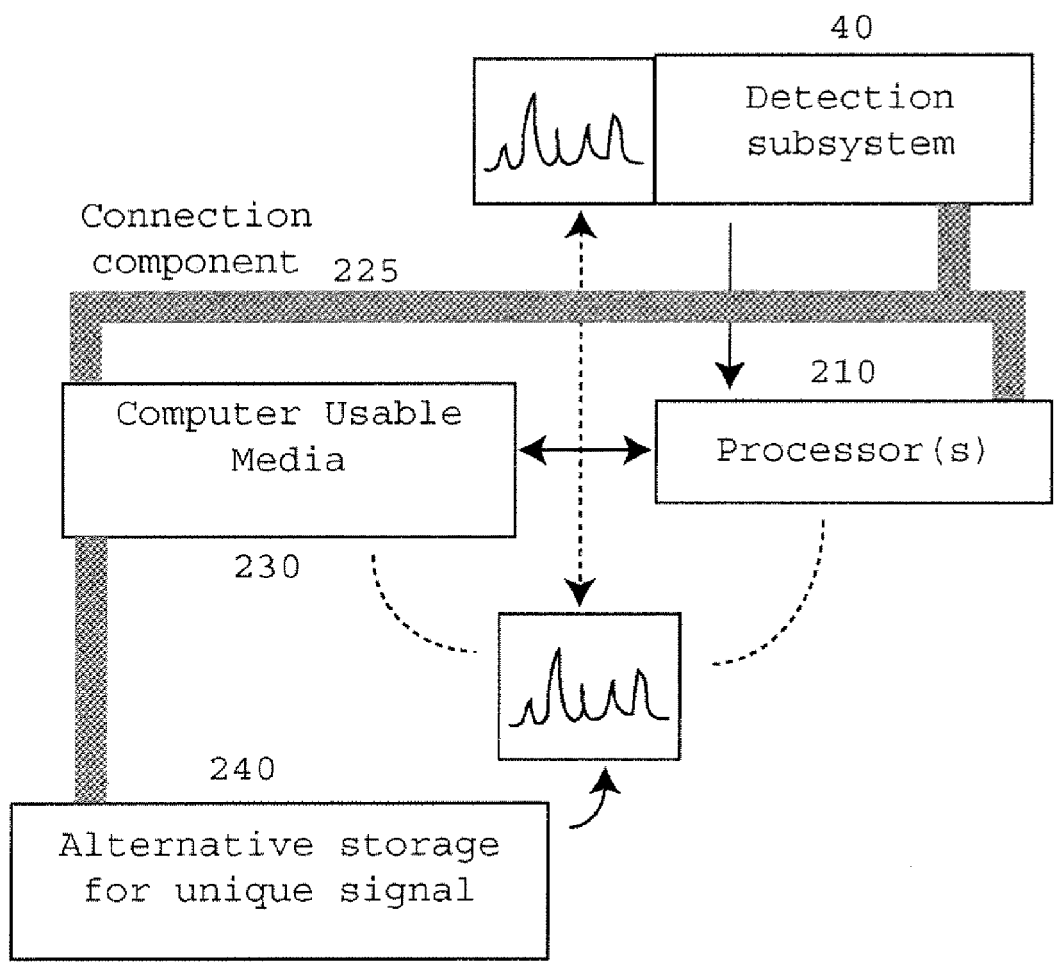
FIG. 12 is a graphical schematic representation of an embodiment of a further component of the system of these teachings.

The characteristic signal obtained from the detection subsystem 40 may be compared to a previously determined characteristic signal by an analysis subsystem 50. In some embodiments, an example of which is shown in FIG. 12, the analysis subsystem 50 includes one or more processors 210 and one or more computer usable media 230 having computer readable code embodied therein, the computer readable code being capable of causing the one or more processors 210 to receive the detected characteristic signal from the detection subsystem, compare the received detected characteristic signal to the previously determined characteristic signal, and identify and/or authenticate if said received detected characteristic signal is sufficiently similar to said previously determined characteristic signal. The analysis subsystem, in an embodiment such as shown in FIG. 12, can also include another computer readable medium 240 having the predetermined substantially unique characteristic signal stored therein. This may include measurements of the signal and/or data derived from measurements of the signal, such as using signal processing and/or cryptographic techniques. Referring to FIG. 12, the one or more processors 210, the one or more computer usable media 230 and the other computer usable media 240 are operatively connected by means of a connection component 225 (such as, but not limited to, a computer bus).

Figure 13:
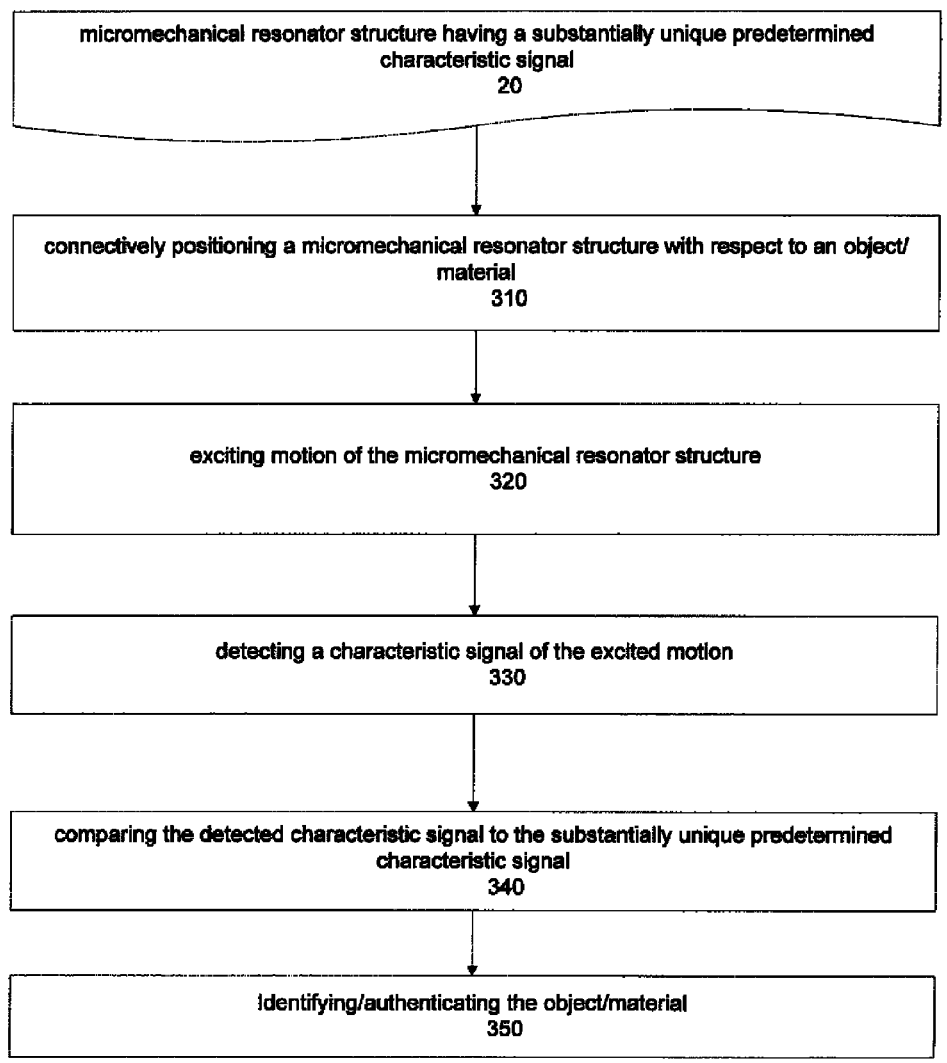
FIG. 13 represents a schematic flowchart representation of an embodiment of the method of these teachings.

Referring to FIG. 13, during operation of various embodiments of a system, a micromechanical resonator structure 20 is connectively positioned with respect to an object (step 310, FIG. 13). Again, the object may be or may include any type of matter or material, including without limitation a solid, liquid, gel, plasma, and so on. Motion of the micromechanical resonator structure is excited (step 320, FIG. 13), a characteristic signal of the excited motion is detected (step 330, FIG. 13) and compared to a previously determined characteristic signal (steps 340, FIG. 13). The object can be identified and/or authenticated as a result of the comparison (step 350, FIG. 13).

In some embodiments, the characteristic signal (also referred to as features of a specific excitation response) may be determined before the micromechanical resonator structure is connectively positioned with respect to the object. For example, the micromechanical resonator may be positioned on a substrate. The specific excitation response is determined by exciting the micromechanical resonator and then detecting the features of the specific excitation response signal (steps 320, 330, FIG. 13). The detected features are stored as stored comparison signal features. The substrate then is attached to the object. The micromechanical resonator is excited and features of the response signal obtained from the excitation are detected and compared to the stored comparison signal features.

In many embodiments, micro- or nanomechanical resonator structures are excited with amplitudes of motion such that their total displacement from their stationary position is small. This is referred to as linear drive, linear motion, or linear response of the resonator. It should be recognized, however, that non-linear actuation is also possible and is potentially useful for achieving further unique signals from resonator devices. In many instances, a resonator structure, excited by any means, may be driven non-linearly. Resonators are typically made to oscillate non-linearly by driving them with large ac drive signals. The text of these teachings, particularly sections referring to driving or exciting resonators, may include driving or exciting resonators such that the resulting motion is non-linear. Detection of non-linear motion is performed in a similar manner as the detection of linear motion. Non-linear excitation of resonators and subsequent detection of non-linear resonance may be used to distinguish actual micromechanical resonators from otherwise fraudulent frequency sources that might otherwise be used in an attempt to fool, trick, or otherwise confuse a detection device, for example, in an attempt to impersonate or otherwise fraudulently authenticate an object or person. As difficult as it might be to construct a device that could emulate the characteristic signal of a micromechanical resonator structure under linear excitation, it is significantly more difficult to simulate the response to non-linear excitation.

One embodiment of a unique signal for identification or authentication that can be obtained from micro- or nanomechanical resonators is the amplitude response as a function of frequency. This response is typically, but not exclusively, detected by means of transduction of a voltage in response to the resonant motion. These detection techniques have been described herein above. Another measurable response of the resonator motion is the phase of the resonator response with respect to the actuation. Detection of the phase of the resonator response also facilitates uniquely identifying or authenticating resonators or the objects to which resonators are attached. Furthermore, it is also possible to include the phase response of a resonator with the amplitude and frequency response of a resonator or array of resonators, either coupled or independent, when associating a particular unique response with a resonator and with an object to which a resonator is attached.

Parametric amplification of the response of a resonator or an array of resonators is also a technique for driving and detecting a resonator or an array of resonators. Parametric amplification of micro- and nanomechanical resonators is described in detail in, for example, Carr et al. Applied Physics Letters, Vol. 77(10), pp. 1545-1547, 2000; and Zalalutdinov et al. Applied Physics Letters, Vol. 78(20), pp. 3142-3144, 2001. Parametric amplification in mechanical resonator systems may include, but is not limited to, the process of pumping the spring constant of the resonator at twice the fundamental frequency with a phase offset from the fundamental driving frequency to achieve either an increase or a decrease in the amplitude of the response of resonator as compared with the response when only the fundamental driving frequency is used to excite the resonator. The width of the frequency response of the resonator, often characterized by its full width at half the maximum amplitude, or the quality factor of the resonator, is also altered when the resonator undergoes parametric amplification. For example, when the resonator is driven at the fundamental frequency and twice the fundamental frequency with the double frequency component being phase offset by 90 degrees, then the amplitude of the response is typically increased and the width of the response is narrowed. Parametric amplification is applicable to both individual resonators and arrays of resonators, either coupled or not coupled. Parametric amplification may be used to excite and detect resonator motion so as to increase the degrees of freedom available in assigning uniqueness to a particular unique resonator signal. Parametric amplification also may be used to distinguish identification or authentication by means of a resonator or an array of resonators from a possible fraudulent frequency source that is intended to trick, fool, or otherwise confuse a detector system into regarding the fraudulent frequency source as a valid identification or authentication source.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. A carrier wave is an equivalent of the above described forms of computer readable media.

Applications

It should be understood that the techniques described here may be advantageous in applications in which it is desired that one resonator structure or numerous resonator structures with different frequency combinations be produced, and in which each particular characteristic signal is difficult to reproduce (e.g., counterfeit). Exemplary embodiments are described hereinbelow. It should be noted that these teachings are not limited only to these exemplary embodiments.

For example, in an implementation in which the frequency spectrum is the characteristic signal, micromechanical resonators may emit signals with a very high Q at high frequencies. With current technology, it is currently technically challenging, expensive, or not possible to produce such signals with digital electronics, and, as discussed, manufacturing variation makes it unlikely that a particular resonator or array of resonators may be constructed on demand.

RFID Tags.

In some embodiments, a resonator structure is configured such that it may be communicated with wirelessly, and used in applications in which a conventional RFID tag is used presently. For example, a resonator structure may replace some of the digital electronics and transmitter in a conventional RFID tag. The exciter may be one of those described above that can operate over a distance. The micromechanical resonator structure may be connected to an antenna and/or other circuit to receive power from the exciter signal to initiate a response from the micromechanical resonator structure. The characteristic signal is of sufficient strength, or can be amplified to a sufficient strength, that it may be received with a wireless receiver.

Such a micromechanical resonator structure RFID device provides the characteristic signal as an identifier. A suitable detector may determine from the characteristic signal which micromechanical resonator structure RFID device is present and therefore what associated object (e.g., goods, identification cards, etc.) is present, with a high degree of confidence. In some cases, the micromechanical resonator structure may be integrated into a label or sticker that may be placed on or embedded in an object.

Resonator structures such as those described here also may be used in combination with conventional RFID technologies. For example, in some embodiments, an REID tag is constructed on the substrate, or on the same device, that includes convention RFID components as well as a micromechanical resonator structure. The RFID tag may be excited by the same or a different signal than the micromechanical resonator structure. An RFID tag reader that is so configured may read the identification number and other information that may be transmitted by conventional RFID tag components and also may read the characteristic signal of the micromechanical resonator structure to further verify the identity with additional confidence. It is also possible to use an REID tag reader to read the conventional RFID tag while using a reader specific to exciting and detecting resonator signals to read the unique resonator signal. Even though two readers might be used, it is possible that the identification system would require both the RFID signal and the resonator signal to be matched in order to generate a valid response for the tag so interrogated, or the object to which the tag was attached.

Identification Cards, Documents, and Devices.

A micromechanical resonator structure may be embedded in or mounted on an identification card, document and/or device, which then may be used, for example, in systems for entry or exit, to verify the identity of the card and/or the individual using the card. Various identification cards, documents, and devices, include without limitation passports, driver's licenses and other government identification documents, membership identification cards, and so on. Each of these types of cards and documents may have a micromechanical resonator structure embedded or mounted on them.

In some embodiments, a wireless exciter and receiver, for example, may be built into a reader, and when the card is brought close to the reader, the characteristic signal wirelessly read from the micromechanical resonator structure. The reader may perform the comparison between the characteristic signal and a previously determined characteristic signal. For example, the analysis subsystem such as that of FIG. 13 may be implemented in the reader. The reader may transmit the characteristic signal to another device, such as a computer, to analyze the characteristic signal. For example, an analysis subsystem such as that of FIG. 13 may be implemented in a device other than the reader that is connected to the reader.

In some embodiments, one or both of the exciter and receiver may be temporarily connected to the micromechanical resonator structure through use of wires or other non-wireless signal propagation means. Connectors may be provided on the card, document, or device to facilitate communication between the exciter and/or receiver and the micromechanical resonator structure.

Identification devices that may include micromechanical resonator structures are not limited to cards and documents, and may include any sort of token, machine, or device. For example, a micromechanical resonator structure may be included in a device that is roughly key-shaped, such as a house key and/or a cylindrical bolt-shaped key. Inserting the key into an electronic lock may facilitate wireless or wired connection between the micromechanical resonator structure and an exciter, power supply, and/or receiver. It should be understood that a key shape is not a limitation, and any suitable shape that allows a micromechanical resonator structure to be connected to or in communication with an exciter, detector, and/or power supply may be used.

For example, devices may be used as a key for entry into physical locations, such as cabinets, closets, room and building entrances, and so on, for example by actuating an actual lock (e.g., door lock, electronic lock, padlock, vehicle lock), for access to and/or operating equipment (e.g., vehicles, motorcycles, scooters), and also for access to any sort of computer-based, communications, or other restricted items or resources.

Credit, Payment, and Financial Services Cards.

A micromechanical resonator structure may be embedded in or mounted on a credit card, payment card and/or a financial services card. For example, in one embodiment, a person provides a card to a shop clerk, who places the card in a card reader. The card reader includes an exciter, a detector, and/or power supply for the micromechanical resonator structure. The micromechanical resonator structure may interact wirelessly and/or connectedly with the exciter, detector and/or power supply. The card reader may receive the characteristic signal, and use it to verify the authenticity of the card, by matching the received signal with information on the card, and/or by providing the signal (or information derived from the signal) to an analysis subsystem, which compares the received characteristic signal to a previously determined signal. The analysis subsystem may be on the shop premises and/or in communication with the shop premises by a telephone network, data network, and so forth.

Product and Item Authentication.

A micromechanical resonator structure may be embedded in or mounted on a product. For example, the micromechanical resonator structure may be provided on a label that is attached to a pallet, box, container, product packaging bottle, and so forth. A reader may be portable or stationary, and may contain an exciter, detector and/or power supply for the micromechanical resonator structure. The reader may operate wireless or connectedly with the micromechanical resonator structure. A person with a reader can use the reader to identify, or verify the identity of the products.

For example, a pharmaceutical company may provide a container that includes a substrate with a micromechanical resonator stricture. A pharmacist may check the authenticity of the package before distributing the pharmaceuticals to patients.

As another example, a machine with disposable and/or interchangeable components may include a reader that interacts with a micromechanical resonator structure in order to determine whether the parts that are installed in the machine are the correct parts, or are parts from the manufacturer of the equipment.

Similarly, collectables (e.g., baseball cards, artwork, toys, and so on) and/or valuables (e.g., jewelry, gemstones), may be enclosed in a container with, or have affixed to them, a micromechanical resonator structure, which may be used to identify the items and/or the authenticity of the items.

Suspended, Interwoven, and Printed a Applications.

In any or all of the abovementioned applications, it may be necessary or desirable to suspend substrates containing RFID tags and micromechanical resonators capable of receiving a signal and sending a signal in a liquid ink, or other liquid-like solution. The end-application may be identification of the liquid-like substance itself, as in, for example, identifying blood samples. Or, the end-application may be in using an ink-like material to mark a surface and in which one would like to use not only the marking of the ink but the unique resonator signal of the resonator suspended and printed with the ink as a means of identifying the ink and/or the material or object upon which the ink is printed. For example, identifying documents or currency is possible with resonator-infused inks that are printed on the documents or the currency.

Substrates containing unique resonator structures may also be attached to fibers, stands, or other materials that are commonly interwoven to form a composite material. The resonator structure so embedded in the fiber-like material may then be used to identify or authenticate the composite material. For example, an article of clothing may be partly or wholly composed of fibers that have imbedded in them or otherwise attached to them micromechanical resonator structure capable of receiving and sending unique signals, thus enabling identification of the article of clothing. It should be noted that clothing is only an example of a composite material in which resonator-embedded fibers may be used and should not be limiting of other applications in which resonator-embedded fibers may be used to perform identification of the composite object.

Although the teachings have been described with respect to various embodiments, it should be realized these teachings are also capable of a wide variety of further and other embodiments within the spirit and scope of the appended claims.

What is claimed is:

1. A method for using imperfections induced by fabrication variations for identification/authentication of an object, the method comprising the steps of:
    connectively positioning a micromechanical resonator structure with respect to the object, the micromechanical resonator structure having a substantially unique characteristic signal; the substantially unique characteristic signal being produced by induced motion of the micromechanical resonator structure; uniqueness of the substantially unique characteristic signal resulting from the imperfections induced by the fabrication variations;
    exciting motion of the micromechanical resonator structure to induce an excitation response signal; said excitation response signal comprising a vibration spectrum, a spectrum of the induced motion, phase as a function of frequency for the induced motion and phase of response with respect to a detection subsystem;
    detecting features of the excitation response signal; and
    comparing the features of the excitation response signal to a stored substantially unique characteristic signal; the stored substantially unique characteristic signal being obtained by exciting motion of the micromechanical resonator structure to induce the substantially unique characteristic signal, detecting features of the substantially unique characteristic signal and storing the detected features as the stored substantially unique characteristic signal; the stored substantially unique characteristic signal uniquely identifying the object within a class of objects; the stored substantially unique characteristic signal being such that regeneration or reassignment of the stored substantially unique characteristic signal to another object within the class is highly unlikely or effectively impossible;
    whereby the object is identified/authenticated.

2. The method of claim 1 further comprising the step of communicating an indication of a result of the comparison.

3. The method of claim 1 wherein the step of exciting motion of the micromechanical resonator structure comprises inducing thermal stresses in the micromechanical resonator structure.

4. The method of claim 1 wherein the step of exciting motion of the micromechanical resonator structure comprises electromagnetically exciting the micromechanical resonator structure.

5. The method of claim 1 wherein the step of exciting motion of the micromechanical resonator structure comprises inducing stresses in the micromechanical resonator structure.

6. The method of claim 1 wherein the step of exciting motion of the micromechanical resonator structure comprises coupling motion from another structure.

7. The method of claim 1 wherein the step of exciting motion of the micromechanical resonator structure comprises acoustically exciting the micromechanical resonator structure.

8. The method of claim 1 wherein the step of detecting the features of the excitation response signal comprises optically detecting the features of the excitation response signal.

9. The method of claim 1 wherein the step of detecting the features of the excitation response signal comprises electromagnetically detecting the features of the excitation response signal.

10. The method of claim 1 wherein the step of detecting the features of the excitation response signal comprises detecting a vibration spectrum of the excitation response signal.

11. A method for using imperfections induced by fabrication variations for identification/authentication of an object, the method comprising the steps of:
positioning a micromechanical resonator on a substrate, the micromechanical resonator having a substantially unique excitation response signal; uniqueness of the substantially unique excitation response signal resulting from the imperfections induced by the fabrication variations; said substantially unique excitation response signal uniquely identifying the object within a class of objects; said substantially unique excitation response signal being such that regeneration or reassignment of said substantially unique excitation response signal to another object within the class is highly unlikely or effectively impossible; said substantially unique excitation response signal produced by induced motion of the micromechanical resonator; said substantially unique excitation response signal comprising features a vibration spectrum, a spectrum of the induced motion, phase as a function of frequency for the induced motion and phase of response with respect to a detection subsystem;
exciting the micromechanical resonator to induce said substantially unique excitation response signal;
detecting features of said substantially unique excitation response signal; and
storing the detected features as a stored substantially unique excitation response signal, wherein said substantially unique excitation response signal is compared with said stored substantially unique excitation response signal for identification/authentication of the object.

12. The method of claim 11, further comprising affixing the substrate to the object.

13. A method for using imperfections induced by fabrication variations for identification of an object, the method comprising the steps of:
exciting motion of a micromechanical resonator structure, the micromechanical resonator structure having a substantially unique characteristic signal, the micromechanical resonator structure connectively positioned with respect to the object; said substantially unique characteristic signal being produced by excited motion of the micromechanical resonator structure; said excited motion of the micromechanical resonator structure inducing the substantially unique characteristic signal which is thereafter stored as a substantially unique previously determined characteristic signal; the substantially unique characteristic signal comprising a vibration spectrum, a spectrum of the excited motion, phase as a function of frequency for the excited motion and phase of response with respect to a detection subsystem; uniqueness of the substantially unique characteristic signal resulting from the imperfections induced by the fabrication variations; said substantially unique characteristic signal uniquely identifying the object within a class of objects; said substantially unique characteristic signal being such that regeneration or reassignment of said substantially unique characteristic signal to another object within the class is highly unlikely or effectively impossible;
detecting a characteristic signal resulting from the excited motion of the micromechanical resonator structure;
comparing the detected characteristic signal to the substantially unique previously determined characteristic signal; and
identifying the object in response to the comparison.

14. The method of claim 13, further comprising, communicating a signal comprising the identification of the object.

15. A method for using imperfections induced by fabrication variations for identification of an object, the method comprising the steps of:
connectively positioning a micromechanical resonator structure with respect to the object, the micromechanical resonator structure having a substantially unique previously determined characteristic signal; uniqueness of the substantially unique previously determined characteristic signal resulting from the imperfections induced by the fabrication variations; the substantially unique previously determined characteristic signal being produced by exciting motion of the micromechanical resonator structure to induce a specific excitation response signal, said specific excitation response signal produced by excited motion of the micromechanical resonator structure; said specific excitation response signal comprising a vibration spectrum, a spectrum of the induced motion, phase as a function of frequency for the induced motion and phase of response with respect to a detection subsystem;
detecting features of the specific excitation response signal and storing the detected features as the substantially unique previously determined characteristic signal; said substantially unique characteristic signal uniquely identifying the object within a class of objects; said substantially unique previously determined characteristic signal being such that regeneration or reassignment of the substantially unique characteristic signal to another object within the class is highly unlikely or effectively impossible; uniqueness of the substantially unique characteristic signal resulting from the imperfections induced by the fabrication variations;
exciting motion of the micromechanical resonator structure;
detecting a characteristic signal resulting from the excited motion of the micromechanical resonator structure;
comparing the detected characteristic signal to the substantially unique previously determined characteristic signal; and
communicating an indication of the result of the comparison.

* * * * *

UNITED STATES PATENT AND TRADEMARK OFFICE
CERTIFICATE OF CORRECTION

| | |
|---|---|
| PATENT NO. | : 9,007,213 B2 |
| APPLICATION NO. | : 12/297489 |
| DATED | : April 14, 2015 |
| INVENTOR(S) | : Keith L. Aubin et al. |

Page 1 of 1

It is certified that error appears in the above-identified patent and that said Letters Patent is hereby corrected as shown below:

In the Claims

In Column 17, lines 42-43 (claim 11), "features a vibration spectrum" should read -- features of a vibration spectrum --

In Column 18, line 23 (claim 14), "comprising," should read -- comprising --

In Column 18, line 49 (claim 15), "unique characteristic signal" should read -- unique previously determined characteristic signal --

In Column 18, line 53 (claim 15), "unique characteristic signal" should read -- unique previously determined characteristic signal --

Signed and Sealed this
Twenty-fifth Day of August, 2015

Michelle K. Lee
*Director of the United States Patent and Trademark Office*